United States Patent
Williams et al.

(10) Patent No.: US 10,414,280 B2
(45) Date of Patent: Sep. 17, 2019

(54) SYSTEMS AND METHODS FOR SELECTIVE BATTERY CONTROL

(71) Applicant: Toyota Motor Engineering & Manufacturing North America, Inc., Erlanger, KY (US)

(72) Inventors: Paxton S. Williams, Milan, MI (US); Colby S. Williams, Milan, MI (US); Scott L. Frederick, Brighton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/808,945

(22) Filed: Nov. 10, 2017

(65) Prior Publication Data

US 2019/0143826 A1    May 16, 2019

(51) Int. Cl.
| | |
|---|---|
| *B60S 5/06* | (2019.01) |
| *B60L 50/60* | (2019.01) |
| *B60L 11/18* | (2006.01) |
| *G05B 15/02* | (2006.01) |
| *G01G 19/08* | (2006.01) |

(52) U.S. Cl.
CPC ....... *B60L 11/1822* (2013.01); *B60L 11/1824* (2013.01); *B60S 5/06* (2013.01); *G01G 19/08* (2013.01); *G05B 15/02* (2013.01); *B60L 2240/60* (2013.01)

(58) Field of Classification Search
CPC .............. B60L 11/1822; B60L 11/1824; B60L 2240/60; B60S 5/06
See application file for complete search history.

(56) References Cited

U.S. PATENT DOCUMENTS

| | | | |
|---|---|---|---|
| 9,103,686 B2 | 8/2015 | Pettersson | |
| 9,573,480 B2 | 2/2017 | Kalyanaraman et al. | |
| 2009/0293759 A1 | 12/2009 | Schmitz | |
| 2009/0315359 A1* | 12/2009 | Suzuki | B60K 1/04 296/64 |
| 2010/0207772 A1* | 8/2010 | Yamamoto | B60L 11/1816 340/636.2 |
| 2011/0226539 A1* | 9/2011 | Huss | B60K 6/46 180/65.21 |
| 2011/0288765 A1* | 11/2011 | Conway | G01C 21/3469 701/533 |
| 2012/0109515 A1* | 5/2012 | Uyeki | G01C 21/3469 701/423 |
| 2013/0079962 A1* | 3/2013 | Ishikawa | B60L 15/2045 701/22 |
| 2013/0282472 A1* | 10/2013 | Penilla | B60S 5/06 705/14.35 |

(Continued)

*Primary Examiner* — Mark A Connolly
(74) *Attorney, Agent, or Firm* — Oblon, McClelland, Maier & Neustadt, L.L.P.

(57) ABSTRACT

A selective battery control system includes a battery exchange station and an at least partially electric vehicle communicably coupled to the battery exchange station. The at least partially electric vehicle includes processing circuitry configured to determine a number of batteries needed for a trip, determine if the at least partially electric vehicle has a correct number of batteries, and in response to the at least partially electric vehicle having an incorrect number of batteries, add or remove batteries until the at least partially electric vehicle has the correct number of batteries for the trip.

20 Claims, 6 Drawing Sheets

(56) References Cited

U.S. PATENT DOCUMENTS

| | | |
|---|---|---|
| 2014/0292235 A1 | 10/2014 | Murase et al. |
| 2015/0039391 A1* | 2/2015 | Hershkovitz .......... G06Q 10/04 705/7.31 |
| 2016/0185246 A1* | 6/2016 | Paul .................... B60L 11/1844 320/106 |
| 2017/0141368 A1 | 5/2017 | Ricci |
| 2017/0187074 A1 | 6/2017 | Sebastian et al. |
| 2018/0253787 A1* | 9/2018 | Takatsuka ........... B60L 11/1822 |

* cited by examiner

SYSTEMS AND METHODS FOR SELECTIVE BATTERY CONTROL

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Current battery powered vehicles carry a set number of batteries on board. These batteries can be heavy and the extra weight must travel with the vehicle. As a result, energy is wasted in transporting all of the batteries around all of the time.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to embodiments of the disclosed subject matter, a selective battery control system includes a battery exchange station and an at least partially electric vehicle communicably coupled to the battery exchange station. The at least partially electric vehicle includes processing circuitry configured to determine a number of batteries needed for a trip, determine if the at least partially electric vehicle has a correct number of batteries, and in response to the at least partially electric vehicle having an incorrect number of batteries, add or remove batteries until the at least partially electric vehicle has the correct number of batteries for the trip.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

Figure 1:
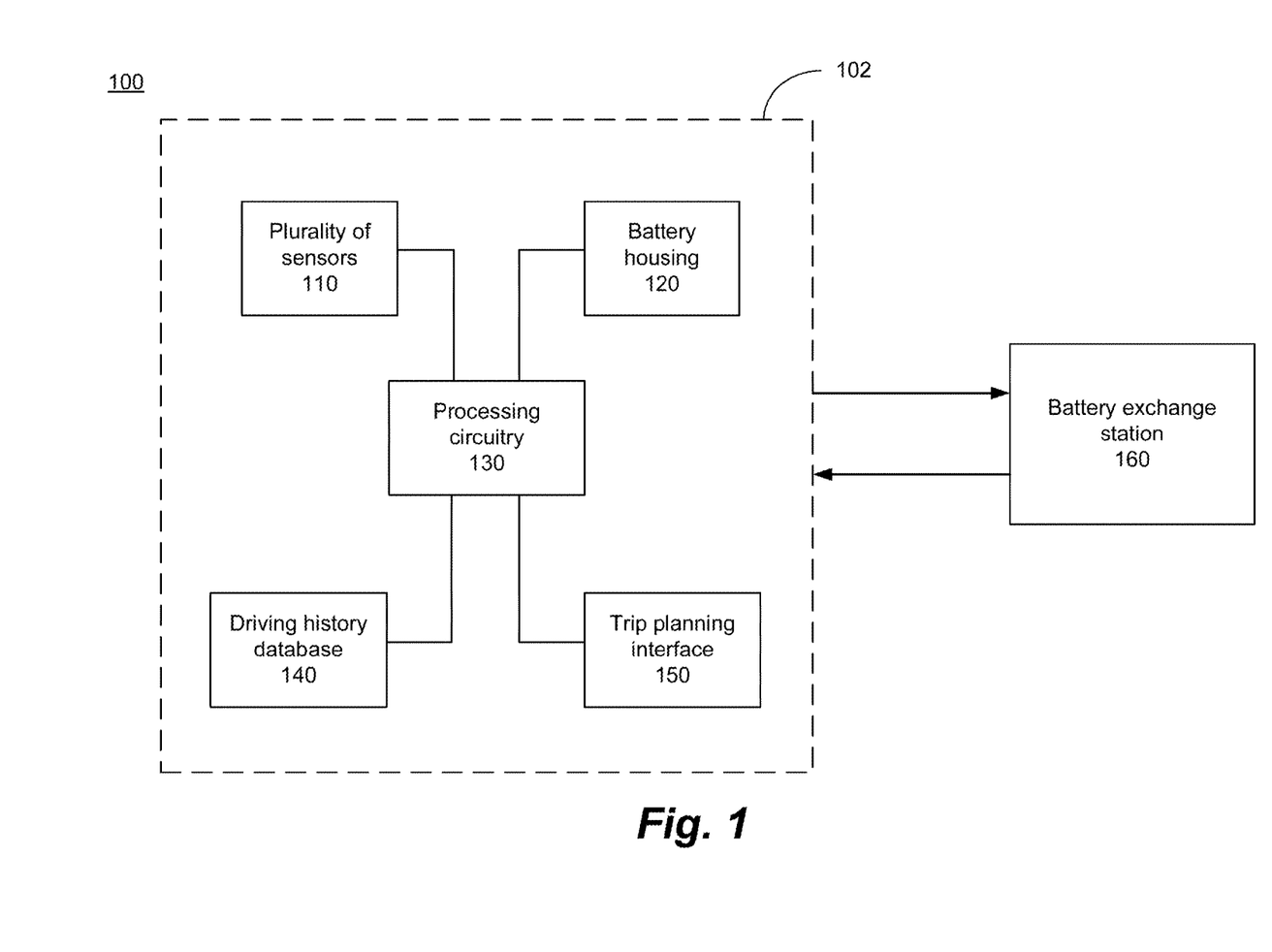
FIG. 1 depicts a block diagram of a selective battery control system according to one or more aspects of the disclosed subject matter.

FIG. 1 depicts a block diagram of a selective battery control system 100 (herein referred to as the system 100) according to one or more aspects of the disclosed subject matter. As will be discussed in more detail, one or more methods according to various embodiments of the disclosed subject matter can be implemented using the system 100 or portions thereof. In other words, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can include a plurality of sensors 110, a battery housing 120, processing circuitry 130, a driving history database 140, a trip planning interface 150, and a battery exchange station 160. In one or more embodiments, the plurality of sensors 110, the battery housing 120, the processing circuitry 130, the driving history database 140, and the trip planning interface 150 can be implemented in apparatus 102, such as a vehicle, for instance, wherein the vehicle can be a fully or partially electric vehicle, and/or a fully or partially autonomous vehicle. Further, the aforementioned components can be electrically connected or in electrical or electronic communication with each other as diagrammatically represented by FIG. 1, for example.

Generally speaking, the system 100 can cause or allow a predetermined number of batteries to be selected for the operation of the vehicle 102.

More specifically, selecting the predetermined number of batteries can optimize the weight of the vehicle 102, thereby maximizing efficiency in operating the vehicle 102. For example, by selecting the predetermined number of batteries needed for a specific trip, the weight of the excess batteries that would not have been used for that specific trip anyway can be temporarily removed from the vehicle 102 (e.g., they can be added again later for a longer trip, they can exchanged in a predetermined charging rotation, etc.). The battery selection can be based on various aspects of vehicle operation and the vehicle's operating environment including a weight of the vehicle 102, a trip plan (e.g., destination and route), estimated traffic expected during the trip, weather forecast, predicted vehicle weight changes (e.g., picking up kids from school, picking up groceries, etc.), and the like.

The plurality of sensors 110 can include various sensors for providing battery selection information. For example, the plurality of sensors 110 can include one or more vehicle weight sensors (e.g., load sensors) to measure total vehicle weight (e.g., weight of vehicle plus any extra people, animals, or objects in/on the vehicle). Additionally, the plurality of sensors 110 can include a GPS antenna to assist with determining and/or executing the trip plan (e.g., destination, route, etc.). The output of the plurality of sensors 110 can be utilized to determine the number of batteries needed to complete a predetermined trip while optimizing the weight of the vehicle 102. For example, the output of the plurality of sensors 110 can be utilized to determine that a short trip to the grocery store only needs 10% (or some amount less than 100%) of total available battery storage to safely make the trip, even calculating for the additional weight that groceries may add to the vehicle 102. As a result, the vehicle operation can be more efficient by reducing excess weight from batteries that would not have been used for the trip anyway.

It should be appreciated that any sensor that can accurately measure the weight of the vehicle can be used in the system 100. Additionally, it should be appreciated that using 10% of total available battery storage is intended as a non-limiting example to illustrate that common trips can use less (even significantly less) than 100% of the total available battery storage in the vehicle. Similarly, any discussion of a specific number of batteries is simply for comparison purposes rather than recommending using that specific number of batteries for a specific purpose.

The battery housing 120 can store the batteries for the vehicle 102 and be the power source for vehicle operation, for example. The battery housing 120 can be easily accessible for battery exchanges. For example, once the predetermined number of batteries has been determined for a specific trip, batteries may need to be added or removed from the battery housing 120 (i.e., battery exchange). In one or more embodiments, the batteries can be added or removed manually. Alternatively, or additionally, the batteries can be added or removed automatically via a battery exchanging system, which could be operated via instructions from the processing circuitry, for example. To assist in the battery exchanges, the vehicle 102 can be communicably coupled to a battery exchange station 160, as further described herein, wherein the battery exchange station 160 can communicate relative battery information to the vehicle 102 including how many batteries are available for use, charge status of batteries, time remaining until each battery is fully charged, and the like.

The processing circuitry 130 can carry out instructions to perform or cause performance of various functions, operations, steps or processes of the system 100. For example, the processing circuitry 130 can be configured to store information in memory, operate the system 100, control the battery housing 120, store and access data in the driving history database 140, and display and receive signals from the trip planning interface 150. The processing circuitry 130 can also receive and/or send signals from/to the battery exchange station 160.

The driving history database 140 can store previous trips of the vehicle 102. When a new trip is planned, the vehicle 102 can access the driving history database 140 to see if the new trip is the same or similar to any previous trip. As a result, the driving history database 140 can add robustness to the system 100 by improving the accuracy of future trips. For example, a user enters a new trip plan to go to the grocery store. The vehicle 102 can compare the current trip plan with previous trips to the grocery store. Assuming that it is the same day of the week, a similar time of day, similar weather, similar vehicle weight, and a similar amount of expected traffic, the vehicle 102 can select the number of batteries for the current trip to the grocery store based on previous trips to the grocery store. For example, if the most recent trip to the grocery store selected 10% of the total available battery storage, but only used 4% for the whole trip, then the current trip may select 6% of the total available battery storage. In other words, a current trip plan can be compared with previous similar trips via the driving history database 140 to more accurately select the number of batteries to optimize the vehicle weight and operation efficiency.

The trip planning interface 150 can display various information to an operator and/or passengers of the vehicle 102 including the location of the vehicle 102, the destination, the route to the destination, the battery level, the time and/or distance remaining until batteries are depleted, and the like. Additionally, the trip planning interface 150 can receive input from the operator and/or passengers of the vehicle 102 including a destination, additional information about the trip plan (e.g., picking up kids from school, picking up a Christmas tree, selecting alternate routes, etc.) that may affect the weight and/or operation of the vehicle 102.

The battery exchange station 160 can be communicably coupled to stand-alone apparatus 102, either via wiring and/or wirelessly. For example, wireless communication can be any suitable form of wireless communication including radio communication, a cellular network, or satellite-based communication. Optionally, the battery exchange station 160 can receive signals from stand-alone apparatus 102. For example, the received signals can be representative of signal(s) requesting an available number of batteries, a battery level of each available battery, a time remaining until fully charged for each battery, and the like.

Figure 2:
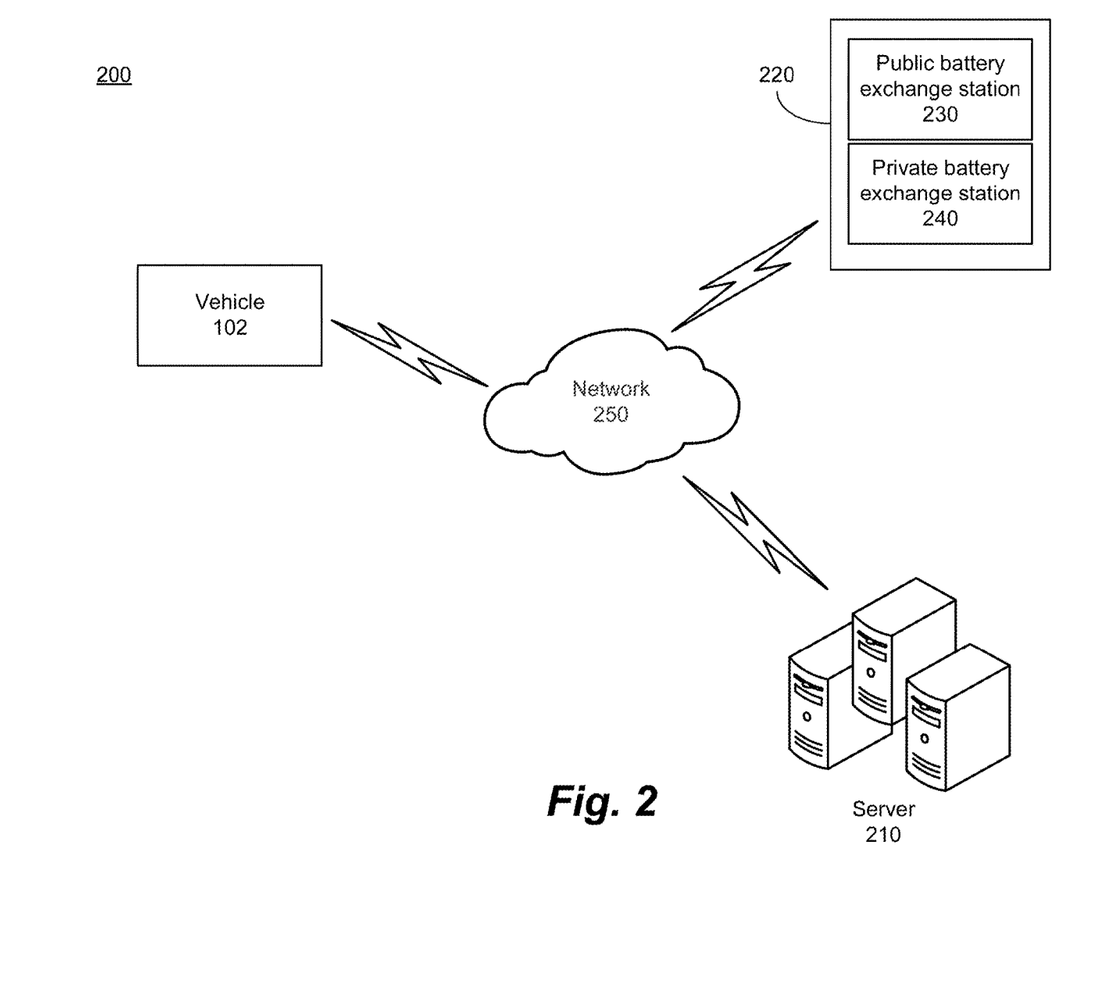
FIG. 2 depicts an exemplary overview of a selective battery control network according to one or more aspects of the disclosed subject matter.

FIG. 2 depicts an exemplary overview of a selective battery control network 200 according to one or more aspects of the disclosed subject matter. The selective battery control network 200 can include the vehicle 102, a server 210, a battery exchange station 220 (which can be one or more of a public battery exchange station 230 and/or a private battery exchange station 240), and a network 250.

The vehicle 102 can represent the vehicle 102 and corresponding capabilities as described in FIG. 1. The vehicle 102 can represent one or more vehicles communicably coupled to the server 210 and the battery exchange station 220 via the network 250.

The server 210 can represent one or more servers communicably coupled to the vehicle 102 and the battery exchange station 220 via the network 250. The server 210 can receive a trip plan from the vehicle 102 and facilitate requesting batteries from one or more battery exchanges 220, for example. In other words, the server 210 can facilitate reserving an appropriate number of batteries for the next leg of the trip and add the battery exchange location to the route. Additionally, the server 210 can facilitate the logistics of battery exchanges for a plurality of vehicles 102, for example.

The battery exchange station 220 can represent one or more battery exchange stations communicably coupled to the vehicle 102 and the server 210 via the network 250. The battery exchange station 220 can be a public battery exchange station 230 and/or a private batter exchange station 240. For example, a public battery exchange station 230 may be accessible to any vehicle 102 (e.g., pay a third party for battery exchanges), while a private battery exchange station 240 may be privately owned by the owner of the vehicle 102 (e.g., a user's garage). It should be appreciate that the batteries (or a portion of the batteries) in the private battery exchange station 240 may still be owned by a third party, but only the owner of the house can access the private battery exchange station 240, for example. Alternatively, or additionally, the batteries (or a portion of the batteries) in the private battery exchange station 240 may also be privately owned by the owner of any vehicle 102 that has access to that private battery exchange station 240.

The network 250 can be a public network, such as the Internet, or a private network such as an LAN or WAN network, or any combination thereof and can also include PSTN or ISDN sub-networks. The network 250 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Figure 3:
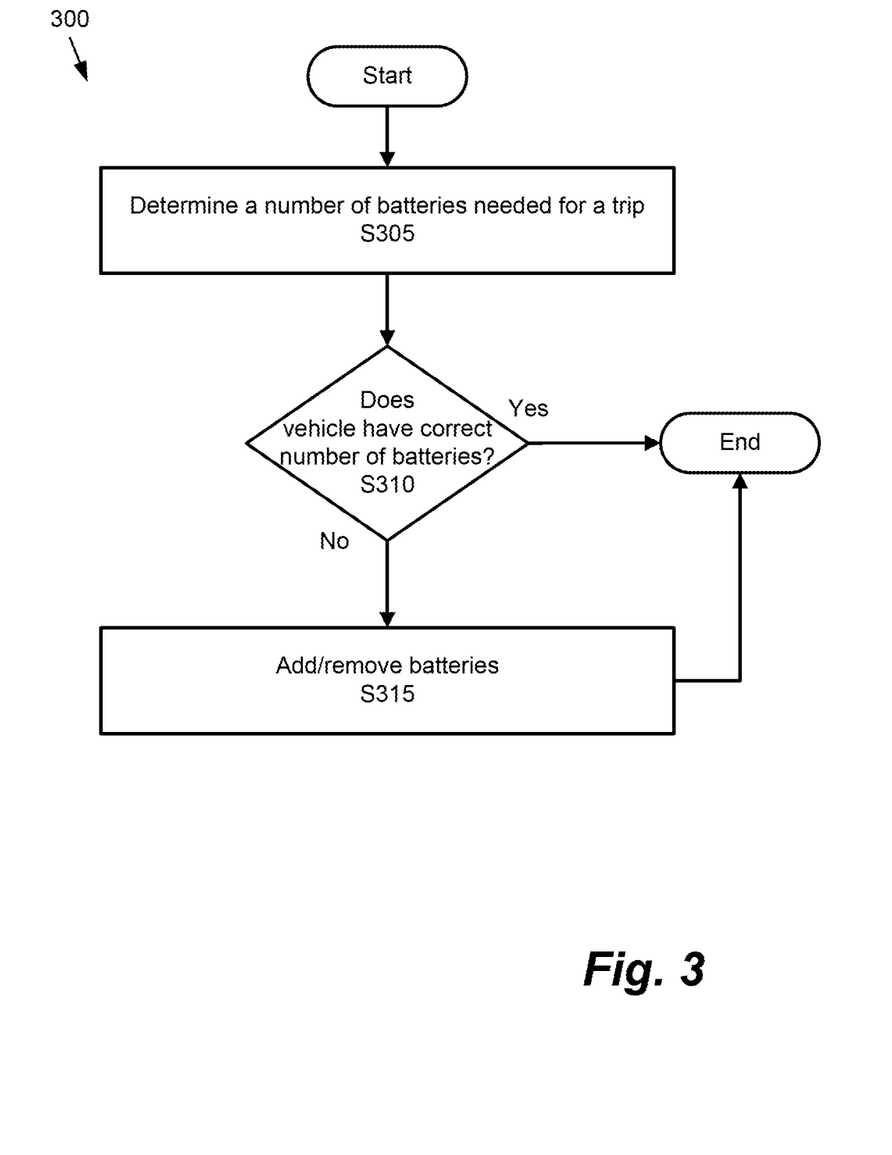
FIG. 3 is an algorithmic flow chart of a method for determining a number of batteries that need to be added or removed for a trip according to one or more aspects of the disclosed subject matter.

FIG. 3 is an algorithmic flow chart of a method 300 for determining a number of batteries that need to be added or removed for a trip according to one or more aspects of the disclosed subject matter.

In S305, a number of batteries needed for a trip can be determined based on various user and environmental inputs, for example. The number of batteries can be selected in an effort to select and carry only the necessary number of batteries required to meet a user's needs. For example, if a vehicle (e.g., the vehicle 102) only needs two batteries to get to the grocery store and back, it can be inefficient to carry the maximum number of batteries the vehicle 102 is capable of carrying if the excess batteries will not be used for that short trip anyway. As a result, selecting only the number of batteries sufficient for a specific trip can reduce the overall weight of the vehicle 102 and therefor increase the operational efficiency.

In S310, it can be determined if the vehicle (e.g., the vehicle 102) has the correct number of batteries based on the determination in S305, for example. If the vehicle 102 does have the correct number of batteries, then the process can end. However, if the vehicle 102 does not have the correct number of batteries, then batteries can added or removed in S315.

In S315, batteries can be added to and/or removed from the vehicle 102, for example. The number of batteries added and/or removed can be based on the current number of batteries in the vehicle and the how many batteries are needed for the trip as determined in S305, for example. A first scenario may be to add batteries. For example, if the vehicle 102 has 5 batteries when the number of batteries was checked in S310, but the number of batteries needed for the trip (as determined in S305) is 10 batteries, then 5 batteries need to be added to the vehicle 102. A second scenario may be to remove batteries. For example, if the vehicle 102 has 10 batteries when the number of batteries is checked in S310, but the number of batteries needed for the trip (as determined in S305) is 5 batteries, then 5 batteries need to be removed from the vehicle 102. A third scenario may be to both add and remove batteries. For example, if the vehicle 102 has 10 batteries when the number of batteries is checked in S310, but it is also determined that the batteries are low on charge, then those batteries can be removed from the vehicle, and the 10 batteries needed for the trip (as determined in S305) can be added to the vehicle 102. After the batteries are added and/or removed from the vehicle 102, the process can end.

In one or more embodiments, the batteries can be added and/or removed manually (e.g., the battery housing 120 may be easily accessible for convenient battery exchange). Alternatively, or additionally, the batteries can be added and/or removed automatically via a system for automatically adding and removing batteries from the battery housing 120, for example. In one or more embodiments, the system for automatically adding and/or removing batteries can be included as all or part of the battery exchange station (e.g., battery exchange station 220). For example, when it is determined that one or more batteries should be added and/or removed from the vehicle 102, the processing circuitry (e.g., the processing circuitry 130) can transmit instructions to the battery exchange station to instruct the battery exchange station to add and/or remove batteries and to add and/or remove them to/from predetermined locations in the battery housing (e.g., for weight distribution reasons).

Figure 4:
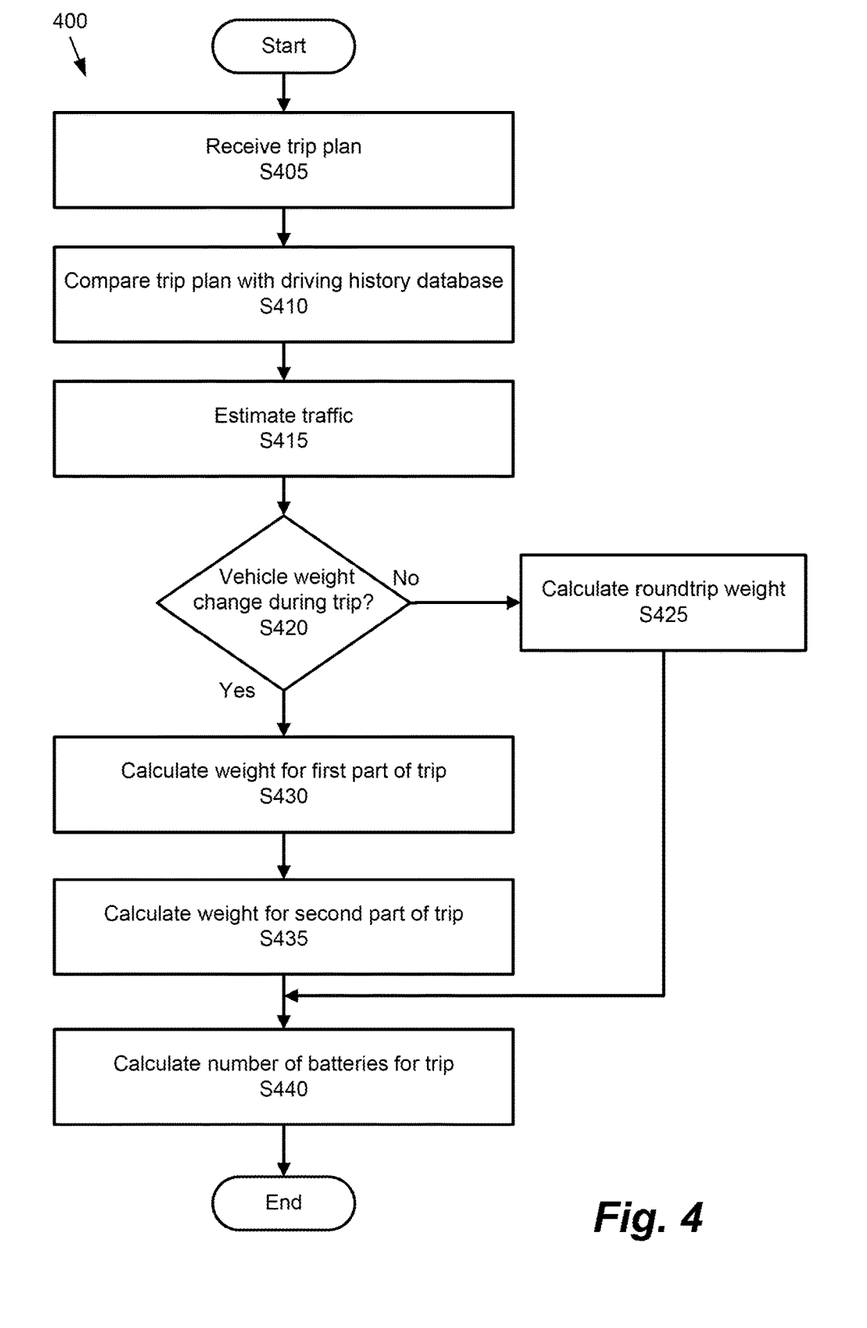
FIG. 4 is an algorithmic flow chart of a method for determining a number of batteries for a trip according to one or more aspects of the disclosed subject matter.

FIG. 4 is an algorithmic flow chart of a method 400 for determining a number of batteries for a trip according to one or more aspects of the disclosed subject matter. The method 400 can correspond to the step for determining the number of batteries needed for a trip in S305, for example.

In S405, a trip plan can be received. For example, an operator and/or passenger of the vehicle 102 can enter a destination via the trip planning interface 150. The trip plan can include various other information including any planned stops on the way to the destination, the reason for going to the destination (e.g., grocery store, picking up kids from school, etc.), the time of day, the weather, whether or not the vehicle will remain running when the vehicle arrives at the destination, and the like.

In S410, the trip plan (e.g., the trip plan received in S405) can be compared with previous trips stored in the driving history database 140, for example. Comparing the current trip plan with previous trips stored in the driving history database can assist in determining the necessary number of batteries to meet the user's trip needs. For example, if the trip plan received in S405 is similar to a previous trip stored in the driving history database 140, the trips can be compared to see if the number of batteries selected for the previous trip was the best number of batteries for that trip. The previous trip may have determined that 10 batteries was the ideal number of batteries, but according to the driving history database 140, the previous trip only actually used 4 batteries to successfully complete the trip. As a result, the comparison of the similar trips may reveal that 6 batteries may be more optimal for the trip plan received in S405. However, it should be appreciated that many factors can affect the number of batteries needed for a successful trip, and over time similar trips may be averaged together to account for any irregularities. For example, after several trips to the grocery store, the driving history database 140 may determine an average weight of groceries that a person or family typically purchases. Further, the driving history database 140 may recognize that a grocery store trip around Thanksgiving may weigh more than the average trip to the grocery store. Additionally, the number of batteries selected for a trip may include a buffer for unplanned circumstances (e.g., road closures, accidents, traffic, weather, etc.).

In S415, traffic can be estimated for the trip plan received in S405. For example, based on traffic estimates (e.g., real time traffic estimates via Google Maps™), time of day (e.g., rush hour), road closures, weather, and the like that may affect traffic can be incorporated into the battery selection. The battery selection may be increased (e.g., expecting traffic) or decreased (e.g., expecting no traffic) based on the traffic estimate.

In S420, it can be determined if vehicle weight (e.g., of vehicle 102) will change during the trip. If it is determined that no (or minimal) weight will be added and/or removed during the trip, then a roundtrip vehicle weight can be calculated in S425. However, if it is determined that the vehicle weight will change during the trip (e.g., picking up/dropping off kids from school, picking up/dropping off furniture, etc.), then a weight for a first part of the trip can be calculated in S430 and weight of the second part of the trip can be calculated in S435.

In S425, the roundtrip vehicle weight can be calculated. In other words, the total weight of the vehicle can be calculated and not expected to change during the trip. The total weight of the vehicle for the trip can include the weight of the vehicle, the weight of passengers, the weight of any cargo, and the like, wherein the weight can be determined via various sensors (e.g., one or more of the plurality of sensors 110). Further, as the total vehicle weight increases, more batteries may be needed to account for operating with the increased weight. However, it is appreciated that the batteries also add weight, which can be accounted for. After the roundtrip vehicle weight is calculated, a number of batteries for the trip can be calculated in S440.

In S430, the total vehicle weight can be calculated for the first part of the trip. For example, a first scenario may be a trip plan corresponding to dropping kids off at school, wherein the first part of the trip will include additional weight from the one or more kids being dropped off. As a result, the total vehicle weight for the first part of the trip can include the additional weight of the kids. A second scenario may be picking kids up from school, wherein the first part of the trip will include a total vehicle weight of the operator and any additional cargo, but without the additional weight of the kids, for example.

In S435, the total vehicle weight can be calculated for the second part of the trip. For example, a first scenario may be dropping off kids from school (e.g., the second part of the trip for the first scenario in S430), wherein the second part of the trip will include a total vehicle weight without the kids after they have been dropped off. A second scenario may be picking kids up from school (e.g., the second part of the trip for the second scenario in S430), wherein the second part of the trip will include a total vehicle weight with the kids after they have been picked up off.

Additionally, it should be appreciated that if the total vehicle weight will change more than once during the trip, then each leg of the trip can be calculated and planned for accordingly. As a result, calculating the expected total vehicle weight for each part of the trip (e.g., when the vehicle weight can be expected to change) can further optimize the number of batteries selected for a trip plan, thereby further optimizing the operational efficiency of the vehicle 102. After the vehicle weight for the first part of the trip has been calculated and the vehicle weight for the second part of the trip has been calculated, the number of batteries for the trip can be calculated in S440.

In S440, the number of batteries for the trip plan received in S405 can be calculated, for example. The number of batteries for the trip plan can be calculated based on the received trip plan in S405, the comparison of the trip plan with the driving history database 140 in S410, the traffic estimated in S415, the determination of whether or not the vehicle weight is expected to change during the trip, and the calculation of the vehicle weight for one or more parts of the trip, for example. As a result, the calculation for the number of batteries for the trip plan can output a result that optimizes operational efficiency of the vehicle. In other words, the vehicle (e.g., vehicle 102) can select and carry only the necessary batteries to meet the needs of the user's trip. As a result, the vehicle 102 does not carry around extra batteries (and therefore extra weight) that will not be used on the trip, thereby increasing operational efficiency. After the number of batteries for the trip has been calculated, the process can end, thereby effectively completing the step of determining the number of batteries needed for a trip in S305, for example.

In addition to calculating the number of batteries for the trip, the placement of the batteries within the batter housing 120 can be determined to ensure an appropriate weight distribution. For example, if it is determined that 50% of the total available batteries are needed for a trip, then those batteries can be positioned in locations of the battery housing 120 such that the weight is appropriately and safely distributed for vehicle operation. Additionally, distributing the weight of the batteries appropriately can prevent inefficiency from an incorrect weight distribution.

Figure 5:
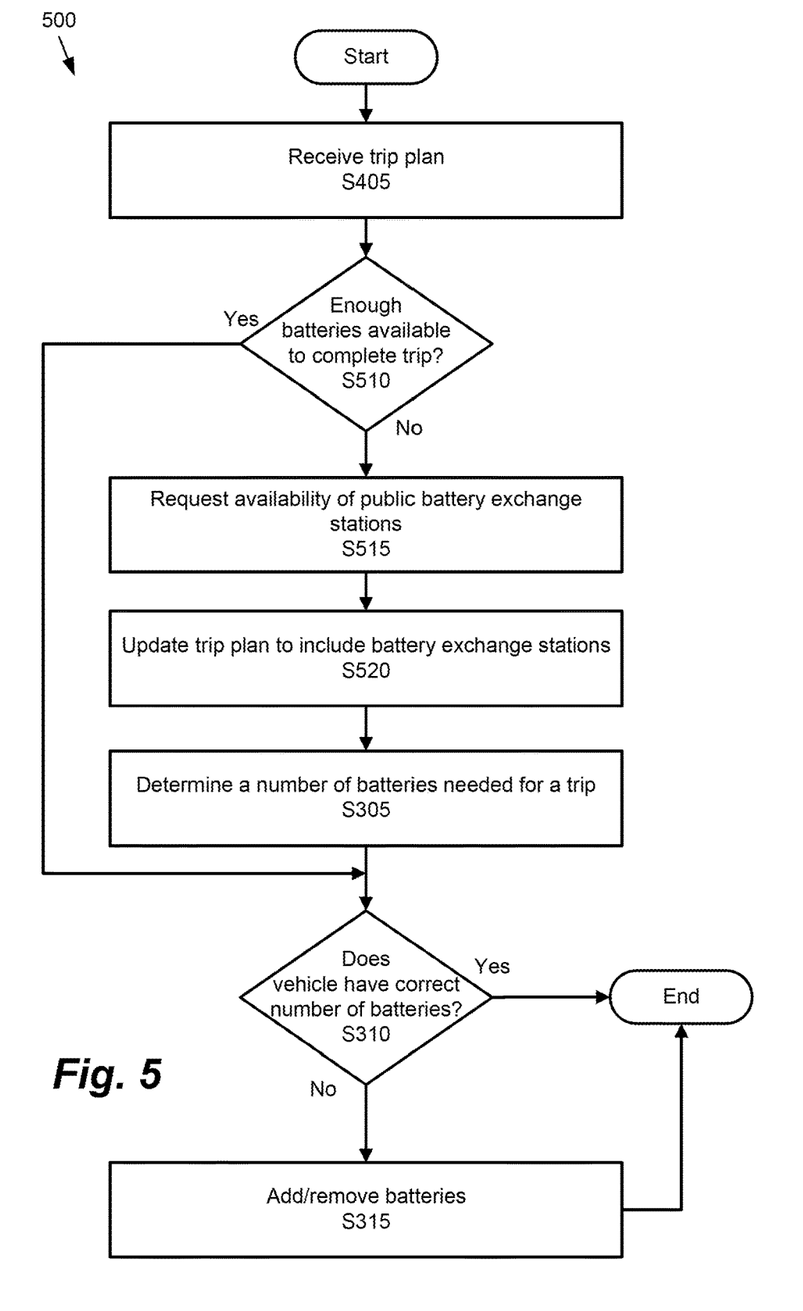
FIG. 5 is an algorithmic flow chart of a method for selecting a number of batteries utilizing public battery exchange stations according to one or more aspects of the disclosed subject matter.

FIG. 5 is an algorithmic flow chart of a method 500 for selecting a number of batteries utilizing public battery exchange stations (e.g., public battery exchange stations 230) according to one or more aspects of the disclosed subject matter. It should be appreciated that steps S305 (e.g., method 400), S310, S315, and S405 can be performed as described in FIG. 3 and FIG. 4.

In S510, it can be determined if enough batteries are available to complete the trip based on the trip plan received in S405, for example. If it is determined that there are enough batteries to complete the trip, then the process can continue to determining if the vehicle has the correct number of batteries in the vehicle in S310. However, it may be determined that there are not enough batteries available for the trip. In a first scenario, the user may have enough batteries in the context of number of batteries, but not enough are appropriately charged for the trip. In second scenario, the user may be making a trip that is father than the maximum range of the vehicle (e.g., vehicle 102) even if all of the available batteries were used. Therefore, if it is determined that there are not enough batteries available for the trip, then the availability of public battery exchange stations 230 can be requested in S515. For example, the request can determine if there are charged batteries available so that the vehicle 102 can incorporate stopping at the public battery exchange station 230 to exchange, add, or remove batteries.

In S520, the trip plan can be updated to include stopping at the battery exchange station 230. The battery exchange station 230 can provide the batteries requested. Additionally, the trip plan can be updated to include a plurality of public battery exchange stations 230 (e.g., for a long road trip where the total vehicle range may be exceeded more than once). It should be appreciated that private battery exchange stations (e.g., private battery exchange station 240) can also be incorporated into the trip plan. For example, if the user of the vehicle 102 owns more than one private battery exchange station 240 (e.g., owns more than one house), then that private battery exchange station 240 can be incorporated into the trip plan if it is reasonably on the route.

As a result, the number of batteries needed for the trip can be calculated in S305 and batteries can be added and/or removed based on S310 and S315. More specifically, the destination of the next battery exchange station 220 (e.g., private or public) can be the destination that the calculation of the number of batteries is based on. In other words, the next battery exchange station 220 may not require the maximum amount of batteries that the vehicle 102 can carry, which allows the number of batteries selected to be optimized for that trip, thereby increasing the operation efficiency. As an example, if a full load of batteries can only get the user past a first battery exchange location 220, but only half way to the next one, the vehicle will have to stop at the first battery exchange location 220 anyway. Therefore, the calculation can be based on selecting (e.g., based on weight, weather, traffic, etc.) only the batteries needed to complete that section of the trip. Once the vehicle has the correct number of batteries for the trip, the process can end.

In the above description of FIG. 3, FIG. 4, and FIG. 5, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

The system 100 includes various advantages including reducing weight from extra batteries, thereby increasing efficiency and reducing energy consumption as a result. Additionally, the system 100 as part of the selective battery control network 200 can provide similar advantages. Further, the advantages include providing a network of battery exchange stations such that users can pick up and drop off batteries at multiple locations based on their trip destination and needs for travel.

Figure 6:
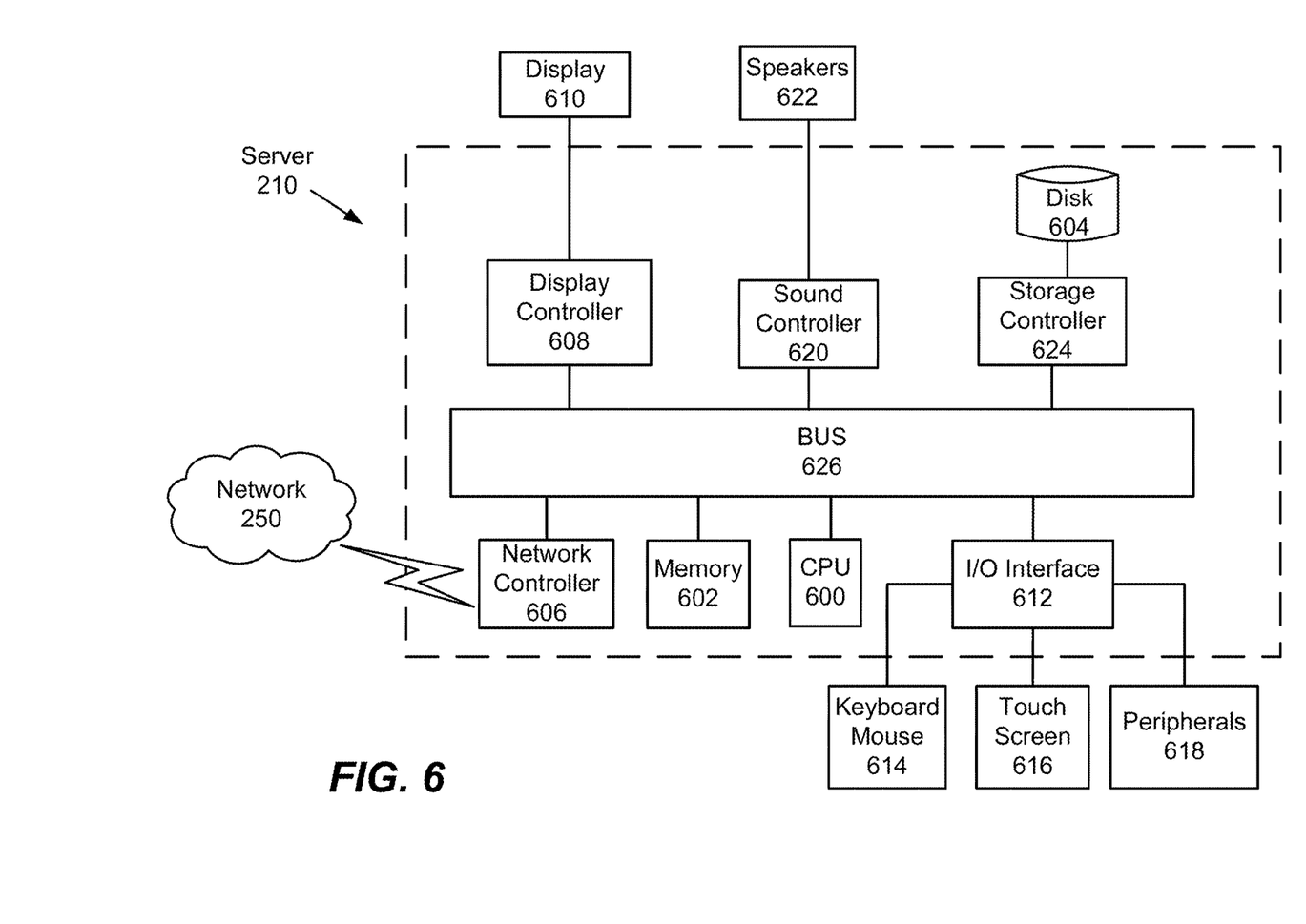
FIG. 6 is a hardware block diagram of a server according to one or more exemplary aspects of the disclosed subject matter.

Next, a hardware description of a computer/device (such as the server 210) according to exemplary embodiments is described with reference to FIG. 6. The hardware description described herein can also be a hardware description of the processing circuitry. In FIG. 6, the server 210 (and/or the processing circuitry 130) includes a CPU 600 which performs one or more of the processes described above/below. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 210 (and/or the processing circuitry 130) communicates, such as a server or computer.

Further, the claimed advancements may be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art.

The hardware elements in order to achieve the server 210 (and/or the processing circuitry 130) may be realized by various circuitry elements. Further, each of the functions of the above described embodiments may be implemented by circuitry, which includes one or more processing circuits. A processing circuit includes a particularly programmed processor, for example, processor (CPU) 600, as shown in FIG. 6. A processing circuit also includes devices such as an application specific integrated circuit (ASIC) and conventional circuit components arranged to perform the recited functions.

In FIG. 6, the server 210 (and/or the processing circuitry 130) includes a CPU 600 which performs the processes described above. The server 210 (and/or the processing circuitry 130) may be a general-purpose computer or a particular, special-purpose machine. In one embodiment, the server 110 becomes a particular, special-purpose machine when the processor 600 is programmed to perform mobile keyboard content delivery (and in particular, any of the processes discussed with reference to FIGS. 7 and 8).

Alternatively, or additionally, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The server 210 (and/or the processing circuitry 130) in FIG. 6 also includes a network controller 606, such as an Intel Ethernet PRO network interface card from Intel Corporation of America, for interfacing with network 250. As can be appreciated, the network 250 can be a public network, such as the Internet, or a private network such as an LAN or WAN network, or any combination thereof and can also include PSTN or ISDN sub-networks. The network 250 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 210 (and/or the processing circuitry 130) further includes a display controller 608, such as a graphics card or graphics adaptor for interfacing with display 610, such as a monitor. A general purpose I/O interface 612 interfaces with a keyboard and/or mouse 614 as well as a touch screen panel 616 on or separate from display 610. General purpose I/O interface also connects to a variety of peripherals 618 including printers and scanners.

A sound controller 620 is also provided in the server 210 (and/or the processing circuitry 130) to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the server 210 (and/or the processing circuitry 130). A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A selective battery control system, comprising:
a battery exchange station; and
an at least partially electric vehicle communicably coupled to the battery exchange station, wherein the at least partially electric vehicle includes processing circuitry configured to
determine a number of batteries needed for a trip,
determine if vehicle weight will changed during the trip,
determine if the at least partially electric vehicle has a correct number of batteries, and
in response to the at least partially electric vehicle having an incorrect number of batteries, instruct the battery exchange station to add or remove batteries until the at least partially electric vehicle has the correct number of batteries for the trip.

2. The selective battery control system of claim 1, wherein the processing circuitry for determining a number of batteries needed for a trip is further configured to
receive a trip plan.

3. The selective battery control system of claim 2, wherein the processing circuitry for determining a number of batteries needed for a trip is further configured to calculate a total vehicle weight when the vehicle weight will not change during the trip.

4. The selective battery control system of claim 3, wherein the processing circuitry for determining a number of batteries needed for a trip is further configured to
calculate a total vehicle weight for a first part of the trip when the vehicle weight will change during the trip, and
calculate a total vehicle weight for a second part of the trip when the vehicle weight will change during the trip, wherein the second part of the trip is the part of the trip that begins when the total vehicle weight changes.

5. The selective battery control system of claim 4, wherein the processing circuitry for determining a number of batteries needed for a trip is further configured to
estimate traffic based on the trip plan.

6. The selective battery control system of claim 5, wherein the processing circuitry for determining a number of batteries needed for a trip is further configured to
calculate a number of batteries for the trip, wherein the calculation is based on the trip plan, the traffic, the driving history database, the vehicle weight, and whether or not the vehicle weight will change during the trip.

7. The selective battery control system of claim 2, wherein the trip plan is received from a trip planning interface.

8. The selective battery control system of claim 7, wherein the trip plan includes a destination, a route, and weather information.

9. The selective battery control system of claim 2, wherein the battery exchange station stores and charges a plurality of batteries for the at least partially electric vehicle.

10. The selective battery control system of claim 1, wherein the at least partially electric vehicle is included in a selective battery control network, wherein the selective battery control network includes one or more at least partially electric vehicles, one or more servers, and one or more battery exchange stations.

11. The selective battery control system of claim 10, wherein the processing circuitry is further configured to
determine if enough batteries are available to complete the trip,
in response to not having enough batteries available to complete the trip, request availability of battery exchange stations, and
update the trip plan based on the availability of the battery exchange stations.

12. The selective battery control system of claim 11, wherein the battery exchange stations include one or more of one or more public battery exchange stations and one or more private battery exchanges stations.

13. A method for selective battery control, comprising:
determining, via processing circuitry, a number of batteries needed for a trip for an at least partially electric vehicle;
determining, via processing circuitry, if vehicle weight will change during the trip;
determining, via the processing circuitry, if the at least partially electric vehicle has a correct number of batteries; and in response to the at least partially electric vehicle having an incorrect number of batteries, instructing, via the processing circuitry, a battery exchange station to add or remove batteries until the at least partially electric vehicle has the correct number of batteries for the trip.

14. The method of claim 13, further comprising:
receiving a trip plan.

15. The method of claim 14, further comprising:
calculating a total vehicle weight when the vehicle weight will not change during the trip.

16. The method of claim 15, further comprising:
calculating a total vehicle weight for a first part of the trip when the vehicle weight will change during the trip; and
calculating a total vehicle weight for a second part of the trip when the vehicle weight will change during the trip, wherein the second part of the trip is the part of the trip that begins when the total vehicle weight changes.

17. The method of claim 16, further comprising:
estimating traffic based on the trip plan; and
calculating a number of batteries for the trip; wherein the calculation is based on the trip plan, the traffic, the driving history database, the vehicle weight, and whether or not the vehicle weight will change during the trip.

18. The method of claim 14, further comprising:
determining if enough batteries are available to complete the trip;
in response to not having enough batteries available to complete the trip, requesting availability of battery exchange stations; and
updating the trip plan based on the availability of the battery exchange stations.

19. A non-transitory computer-readable storage medium storing computer-readable instructions thereon which, when executed by a computer, cause the computer to perform a method, the method comprising:
determining a number of batteries needed for a trip for an at least partially electric vehicle;
determining, via processing circuitry, if vehicle weight will change during the trip;
determining if the at least partially electric vehicle has a correct number of batteries; and
in response to the at least partially electric vehicle having an incorrect number of batteries, instructing a battery exchange station to add or remove batteries until the at least partially electric vehicle has the correct number of batteries for the trip.

20. The non-transitory computer-readable storage medium of claim 19, further comprising:
receiving a trip plan;
calculating a total vehicle weight when the vehicle weight will not change during the trip;
calculating a total vehicle weight for a first part of the trip when the vehicle weight will change during the trip;
calculating a total vehicle weight for a second part of the trip when the vehicle weight will change during the trip, wherein the second part of the trip is the part of the trip that begins when the total vehicle weight changes;
estimating traffic based on the trip plan;
calculating a number of batteries for the trip, wherein the calculation is based on the trip plan, the traffic, the driving history database, the vehicle weight, and whether or not the vehicle weight will change during the trip;
determining if enough batteries are available to complete the trip;
in response to not having enough batteries available to complete the trip, requesting availability of battery exchange stations; and
updating the trip plan based on the availability of the battery exchange stations.

* * * * *